United States Patent
Teuwen

(10) Patent No.: US 8,209,543 B2
(45) Date of Patent: Jun. 26, 2012

(54) WATERMARKING OF A PROCESSING MODULE

(75) Inventor: Philippe Teuwen, Ixelles (BE)

(73) Assignee: NXP B.V., Eindhoven (NL)

(*) Notice: Subject to any disclaimer, the term of this patent is extended or adjusted under 35 U.S.C. 154(b) by 1121 days.

(21) Appl. No.: 12/088,717

(22) PCT Filed: Sep. 25, 2006

(86) PCT No.: PCT/IB2006/053469
§ 371 (c)(1),
(2), (4) Date: Apr. 1, 2008

(87) PCT Pub. No.: WO2007/036863
PCT Pub. Date: Apr. 5, 2007

(65) Prior Publication Data
US 2008/0256361 A1    Oct. 16, 2008

(30) Foreign Application Priority Data
Sep. 30, 2005 (EP) .................................. 05109058

(51) Int. Cl.
*H04L 9/32* (2006.01)
(52) U.S. Cl. ............. 713/187; 713/176; 726/22; 726/26
(58) Field of Classification Search .................. 713/176, 713/187; 726/22, 26
See application file for complete search history.

(56) References Cited

U.S. PATENT DOCUMENTS

| | | | |
|---|---|---|---|
| 4,685,055 A | 8/1987 | Thomas | |
| 2002/0037091 A1* | 3/2002 | Terasaki | 382/100 |
| 2002/0110260 A1* | 8/2002 | Wakasu | 382/100 |
| 2003/0217280 A1 | 11/2003 | Keaton et al. | |
| 2005/0021966 A1* | 1/2005 | Chow et al. | 713/176 |

FOREIGN PATENT DOCUMENTS

| | | |
|---|---|---|
| CN | 1327585 A | 12/2001 |
| EP | 1538619 A1 | 6/2005 |
| WO | 01/03136 A2 | 1/2001 |
| WO | 02101519 A2 | 12/2002 |
| WO | 2004021178 A2 | 3/2004 |

OTHER PUBLICATIONS

Byun, Sung-Cheal; et al "More on the Multimedia Data Security for E-Commerce" Information Technology: Research and Education, 2003. Proceedings, Aug. 11, 2003, pp. 412-415.

Pieprzyk, J: "Fingerprints for Copyright Software Protection" Information Security; Second International Workshop, ISW '99. Proceedings (Lecture Notes in Computer Science vol. 1729) Springer-Verlag Berlin, Germany, 1999, pp. 178-190.

* cited by examiner

*Primary Examiner* — Eleni Shiferaw
*Assistant Examiner* — Tamara Teslovich

(57) ABSTRACT

The present invention relates to a method for watermarking a processing module. The processing module is designed to process an electronic signal and form a processed signal involving steps of applying a first functional operator to cause a significant alteration to the processed signal. The first operator is embedded in the processing module. Additionally, a second functional operator is provided to co-operate with the first operator-so the alteration is essentially cancelled. The second operator-is adapted to act as an extractable identifier serving as a watermark for the processing module. An advantage with the method is the fact that since the first and the second operators are implemented as functional processing blocks, conventional debugging tools cannot be used to attack the processing module.

18 Claims, 2 Drawing Sheets

WATERMARKING OF A PROCESSING MODULE

The present invention relates to a method for watermarking a processing module configured to process an electronic signal. The present invention also relates to a corresponding system comprising a watermarked processing module.

Copyright infringement is today a large scale problem and concern. Modern techniques allow for the manufacturing of perfect copies of information and content. To protect copyrights for such information and content, such as digital information and digital content, different techniques are applied. There has been significant recent research into "watermarking" (hidden copyright messages) and "fingerprinting" (hidden serial numbers or a set of characteristics that tend to distinguish an object from other similar objects). The idea is that the latter can be used to detect copyright violators and the former to prosecute them. The objective of watermarking techniques is to imperceivably and inseparably embed information in content that carries copyright information. Such techniques are especially useful for audio, video and other works available in digital form.

One way of "watermarking" software packages, or more generally a processing module, is by using a serial number that unlocks the processing module. The serial number here also serve as a watermark that could be used to detect and prosecute copyright violators.

U.S. Pat. No. 4,685,055 describes such a method for protecting a software package, wherein a protection subroutine with a unique reference code is emplaced in the software package to be protected. The package also contains a validation program. The protection subroutine and validation program connect with an ESD, "electronic security devices", and both the ESD and the program communicate with a secure computer. Upon receipt of inputs of the software serial number and reference code and the ESD identifier, the computer generates a validation code which causes the protection subroutine to command execution of the protected software by its host computer.

An other example, more suitable for embedded systems and circuit modules is disclosed in WO2004021178. This patent application describes a circuit module that contains a sub-circuit that is capable of providing a level of performance dependent on a version number that is passed to the sub-circuit from a version write-protected number memory. In this case, the version number can serve as a watermark for the circuit module. FIG. 1 illustrates such a circuit module A which has been watermarked with a serial number. This watermarking technique does not allow for full protection since an attacker using a debugger can watch the communication between the circuit module and the serial number, whereby the attacker can remove ("wash away") the watermark/serial number. In this case with an embedded software application, this is very simplified done by running the application in debugger mode, finding the part of the debugged source code where the serial number checking is done, deleting this part of the source code, recompile the code, whereby an embedded software application free from any serial number/watermark is obtained.

Even though the above examples describe techniques that in many cases provides sufficient protection, they are disadvantageously designed against attacks since there is a clear procedural link between the serial number (or "key") and the software or circuits/processing module. The link between the serial number and the software or circuits/processing module can easily be found, if the attacker is utilizing a debugger. This is also true, and very similar, in the case when a so called "dongle" protection is used to unlock licensed software. A dongle is a hardware device that serves as copy protection for certain software by rendering the software inoperable when the device is not plugged into a printer port. Another disadvantageous with the above described techniques is the fact that the watermarking technique may have to be disclosed during a public lawsuit, making it possible for an attacker to successfully, by reverse-engineering, remove any traces of watermarks in content watermarked with a similar technique.

There is therefore a need for a method that provides watermarking of a processing module where the procedural link between the processing module and the watermark is not that obvious. Furthermore, the method has to be robust against knowledge acquired after a public lawsuit.

The above need is met by a method for watermarking a processing module configured to process an electronic signal as defined in claim 1 below. Furthermore, an advantageous system using such a method is defined in claim 5. The appended sub-claims define advantageous embodiments in accordance with the present invention.

According to a first aspect of the present invention, there is provided a method for watermarking a processing module which is configured to process an electronic signal thereby forming a processed signal. The method further comprises the steps of applying a first functional operator arranged to cause a significant alteration to said processed signal, which first functional operator is embedded in the processing module, and arranging a second functional operator configured to co-operate with the first operator such that said alteration is essentially cancelled, wherein the second operators is adapted to act as an extractable identifier serving as a watermark for said processing module.

The expression "extractable identifier" here indicates that the operator in question is extractable in a court of law in the case of a trial regarding the ownership of the processing module. Depending of the implementation of the invention, the second operator (or at least part of it) can be visible for the eye (for example be implemented in a separate integrated circuit), or be extractable by means of a suitable extraction method.

It should be understood that the present invention relates to watermarking of a digital processing module, rather than watermarking of digital content. In other words, just like conventional watermarking makes it possible to determine whether digital content originates from a specific source, watermarking according to the present invention makes it possible to determine whether a software algorithm (or any other processing module) originates from a specific source. Such determination will facilitate the prosecution of copyright infringers.

The expression "processing module" should be understood to preferably be a building block integrated in a digital system. Examples of digital systems can be both hardware and software implemented systems, such as circuit modules mounted on a printed circuit board (PCB) or a software package. As understood by the person skilled in the art, the first operators' alteration of the processed signal, while still embedded in the processing module, can take place either before, after or during (where the first operator is fully embedded with the processing module) the processing of the electrical signal.

The robustness of the method according to the present invention depends on the fact that a first part of the watermark, i.e. the first operator, is hidden, while the remaining part of the watermark, i.e. the second operator, is extractable, optionally even visible for the user.

As the first, hidden operator significantly alters the processed signal, the second operator is needed to obtain the correct output from the processing module. Hence, by using a method according to the present invention, simply removing the second operator ("washing away" the watermark) will render the processing module useless.

Further, as the operators are functional operators, e.g. processing functions, conventional debugging tools can not be used to attack the first operator, hidden in the processing module. An advantage is that the procedural link between the processing module and the second operator is non obvious, as the information being transferred between the first operator and the second operator is functional information rather than a static serial number or the like. Even if the second operator is disclosed through a trial, performing reverse engineering on the processing module to identify and remove the first operator will involve complicated research, hopefully exceeding the effort of developing the processing module from scratch.

Preferably, the cooperation between said first and second operators is very sensitive to any alteration of said second operator. Thereby, just the slightest alteration to the second operator will modify the output in a very distinct manner. An exemplifying case is for instance if an operator is e.g. a filter and its coefficients are the proof disclosed in a trial case, an attacker could modify slightly the coefficients or choose another set of coefficients resulting in the same filter and the protection is broken. A high sensibility of the embedded first operator against modifications is preferred.

The first functional operator, which is embedded in the processing module, and the second functional operator can be executed sequentially. As would be obvious for the person skilled in the art, the sequential order of the operators is not of importance. An advantage with this embodiment is that the order can he dependant of implementation details rather than the functionality of the processing functions. Parallel processing is also possible. In one case, the first operator could be embedded with a first processing module, while the second operator is embedded with a second processing module. A combiner module combines the significantly altered outputs from the two processing modules, resulting in an output free of any alteration as the alteration produced by the first and second operators are "equaled out". Another scenario is possible, wherein the first operator is embedded as described above, and the second operator is a parallel stand-alone functional operator, and where the combiner combines the altered signals, producing an unaltered processed signal.

According to a second aspect of the present invention there is provided a processing module, arranged to process an electronic signal thereby forming a processed signal, comprising a first functional operator arranged to cause a significant alteration to said processed signal, said first functional operator being embedded in said processing module, and a second functional operator configured to co-operate with said first operator such that said alteration is essentially cancelled, wherein at least part of said second operator is adapted to act as an extractable identifier serving as a watermark for said processing module. As described above in relation to the first aspect of the present invention, this novel processing module provides improved protection against copyright infringement since as the first and the second operators are implemented as functional operators, conventional debugging tools can not be used to attack the processing module. The processing module can in this case be implemented in computer software, arranged to be loaded and executed on a computer processor.

According to a third aspect of the present invention there is provided a digital signal processing equipment, comprising a processing module as described above. Digital signal processing equipment could be selected from many different areas such as for example, but not limited to, the digital audio-, video- and communication-area. Examples of such digital signal processing equipment, where such processing modules, watermarked using a method according to the present invention, are present, could for example television sets, mobile phones, mp3-players, medical equipment, and audio and display units.

Further features of, and advantages with, the present invention will become apparent when studying the appended claims and the following description. Those skilled in the art realize that different features of the present invention can be combined to create embodiments other than those described in the following.

The present invention will now be described in more detail with reference to the accompanying drawings.

Figure 1:
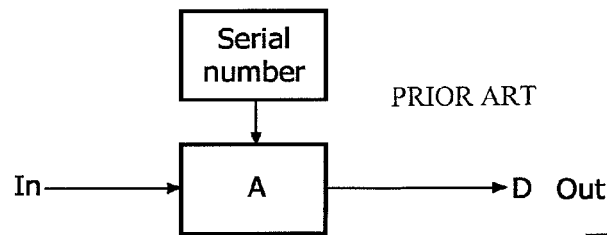
FIG. 1 illustrates a processing module A which is watermarked with a serial number according to prior art.
Figure 2A:
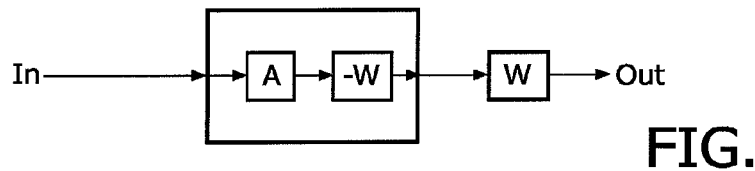
FIG. 2a illustrates a first embodiment, wherein a processing module A is watermarked using a method according to the present invention.

In FIG. 2a a processing module A has been watermarked using two antagonist operators, here processes W and −W. The first operator −W has been integrated (imbedded) with the processing block A and looks as a "normal" part of the data processing. The purpose of the first operator −W is to provide a strong alteration of the output of the processing module A. A second operator W has been sequentially arranged outside the processing block A, acting as an "antidote", providing an antagonist alteration of the output of the processing module A. The expression "watermarked" is understood to signify integration of an "electronic signature" (divided into two operators −W and W) together with the processing module (A), thereby providing proof of ownership of the processing module in case of a trial. Depending of the implementation of the invention, the second operator (or at least part of it) can be visible for the eye (for example be implemented in a separate integrated circuit), or be extractable (verified) by means of a suitable extraction method.

For example, the second process block W can be provided with a verification input and a verification output. Operator extraction/verification is performed by applying a predefined first data set is to the verification input, whereby a second data set is extracted from the verification output. This obtained data set can be compared to a reference data set, where the reference data set is extracted from a "true" process block W. A significant resemblance between the second data set and the reference data set indicates that the second operator W is indeed a "true" watermark for the processing module A. Hence, this provides for a possibility to determine whether a software algorithm (or any other processing module) originates from a specific source. As described above, such determination facilitates the prosecution of copyright infringers.

As understood by the person skilled in the art, this combination of the first and the second operators provides only a small, or non existing, alteration of the "correct" output of the processing module A. This method is preferably used in a similar case as initially described, where a processing module is delivered to a third party company for evaluation. In this case, the processing block A (wherein the first process −W has been integrated) is delivered together with the second process W.

This provides for a much more secure method of watermarking, in comparison to prior art, since an attacker is not provided with sufficient information to remove the watermark because if the second operator is modified, the first process will not be the antidote and the output will be strongly affected. The use of conventional debugging tools will hence provide insufficient help for the attacker. Furthermore, bypassing of the second process will not solve the problem because of the first process' strong alteration of the output from the processing module A. The case of bypassing both blocks will neither solve the attacker's problem since the processing module A will not process anymore and the data processing behavior will be affected.

Preferably, the implementation of the first and the second process will employ for example complex hashing techniques, rendering the output from the processing module A (wherein the first operator has been embedded) unusable. In some implementation, such as in System-on-Chip, SoC, this level of integration, as illustrated in FIG. 2a, of the first operator might be sufficient, since reverse engineering is too complicated.

Figure 2B:
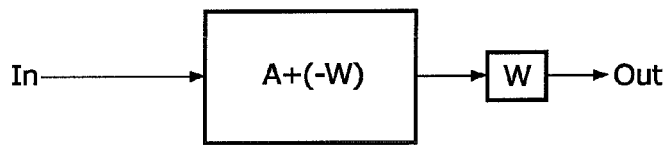
FIG. 2b illustrates a second embodiment, wherein a processing module A is watermarked using a method according to the present invention.

In FIG. 2b, the first process −W has been completely embedded with the processing module A. As in FIG. 2a, the second process W has been sequentially arranged outside the processing block A, acting as an "antidote", providing an antagonist alteration, compared to the first operator, of the output of the processing module A. In some cases, this type of implementation, wherein the first operator is fully integrated with the processing module A, is more suitable, especially when the nature of blocks A and −W is similar, allowing a functional merge resulting in one unique processing function or allowing swapping of some of the basic linear operations of A and −W. A very simple example to illustrate the technique could be A being a gain (*K) operator and −W a multiplication with a square signal inverting the processed signal every second (*−1, 1, −1, 1 . . . ). Combination of both would be the multiplication of the processed signal by a scaled square signal (−K, K, −K, K . . . ). Removing this block would wash out also the needed gain K from the original block A.

Figure 2C:
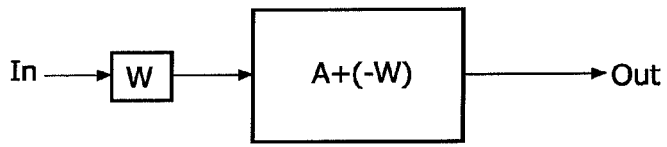
FIG. 2c illustrates a third embodiment, wherein a processing module A is watermarked using a method according to the present invention.

As understood by the person skilled in the art, other implementation strategies are possible. One of these possibilities is illustrated in FIG. 2c, where the sequential order has been changed in comparison to FIG. 2b, and the antidote process W is applied before the process altered by process −W.

Figure 2D:
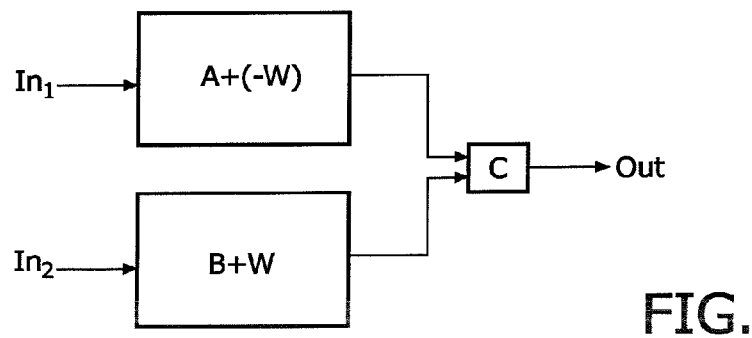
FIG. 2d illustrates a fourth embodiment, wherein two processing modules A and B are watermarked using a method according to the present invention.

FIG. 2d illustrates another embodiment, wherein two parallel processing modules A and B are present. In this case, the process −W is embedded with processing module A and the antidote process W is embedded with processing module B. A combiner module C combines the significantly altered outputs from the two processing modules A and B, resulting in an output free of any alteration as the alteration produced by the processes −W and W.

Figure 3:
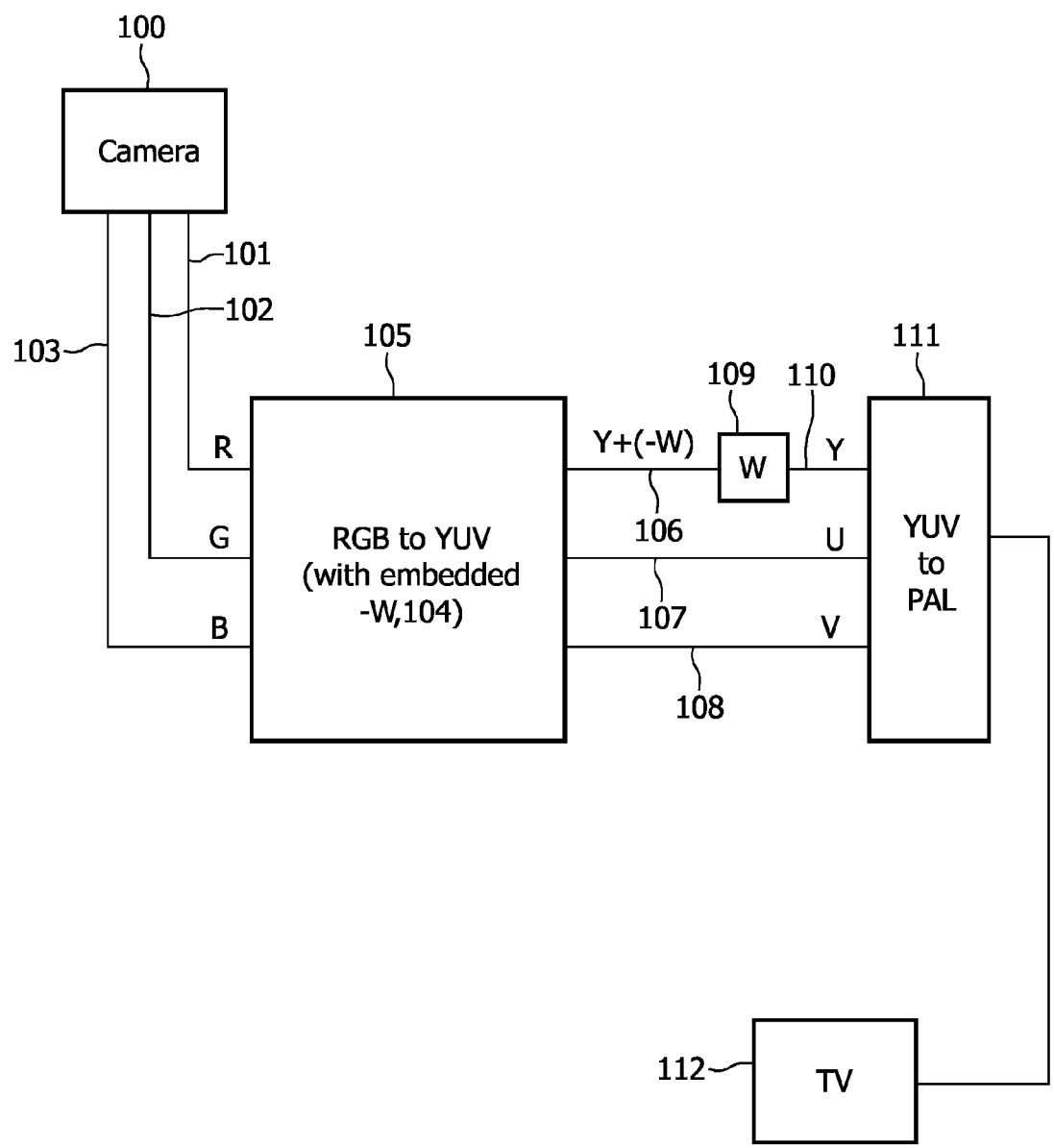
FIG. 3 illustrates an exemplary system for converting raw image data from a camera to image data suitable for a television set, using a RGB to YUV color space conversion processing module, wherein the processing module is watermarked using a method according to the present invention.

In FIG. 3, an exemplary system for converting raw image data from a camera to image data suitable for a television set using a method according to the present invention, is shown.

A camera 100 produces raw image data through separate red, green and blue color channels 101, 102 and 103. A color space conversion processing module 105, converts the red 101, green 102 and blue 103 color channels to one luminance (Y) and two chrominance (U/V) 106 and 107 components. A first process −W 104 is fully embedded into the color space conversion processing module 105 in such a way that the luminance component 106 is significantly altered, producing a combined luminance and first process component (Y+(−W)). To achieve a "correct" luminance component, a second process block 109 is introduced. The process block 109 acts as an antidote, providing an antagonist alteration of the combined luminance and first process component (Y+(−W)), whereby a correct luminance component 110 is produced. Further, the "corrected" luminance component 110 and the two chrominance components 107 and 108 are inputs to a YUV to PAL/NTSC conversion module 111. The YUV to PAL/NTSC conversion module 111 produces synchronized television signal that are displayed on the television set 112.

Since the only way to "correct" the processing module output Y+(−W), is by using the second process block 109, a third party has to leave the second process block 109 unaltered, whereby the second process block 109 can be used as a watermark in case of a possible copyright infringement trial against a third party.

Even though the invention has been described with reference to specific exemplifying embodiments thereof, many different alterations, modifications and the like will become apparent for those skilled in the art. The described embodiments are therefore not intended to limit the scope of the invention, as defined by the appended claims. For example, the invention can be implemented in analog system such as audio scrambling performed on pay-tv, thereby providing increased copyright protection for the audio scrambling module.

The invention claimed is:

1. A method, for watermarking a processing module, said processing module being configured to process an electronic signal thereby forming a processed signal, comprising the steps of:
   applying a first functional operator arranged to cause an alteration to said processed signal, said first operator being embedded in said processing module; and
   arranging a second functional operator configured to co-operate with said first operator such that said alteration is cancelled,
   wherein at least a part of said second operator is adapted to act as an extractable identifier serving as a watermark for said processing module.

2. A method according to claim 1, wherein said co-operation between said first and second functional operators is responsive to any alteration of said second operator.

3. A method according to claim 1, wherein the steps of applying a first functional operator and arranging a second functional operator are sequentially executed.

4. A method according to claim 1, wherein the step of arranging a second functional operator includes embedding the second functional operator with an additional processing module and further including a step of combining outputs from the processing module and the additional processing module to produce the processed signal free of alterations.

5. A processing module, arranged to process an electronic signal thereby forming a processed signal, comprising:
   a first functional operator arranged as part of a circuit to cause an alteration to said processed signal, said first operator being embedded in said processing module; and a second functional operator configured to co-operate with said first operator such that said alteration is cancelled, wherein at least part of said second operator is adapted to act as an extractable identifier serving as a watermark for said processing module.

6. A processing module according to claim 5, wherein said co-operation between said first and second functional operators is responsive to any alteration of said second operator.

7. A processing module according to claim 6, wherein said processing module is configured and arranged to execute the first functional operator and the second functional operator sequentially.

8. A processing module according to claim 6, further comprising a combiner module to produce the processed signal free of alterations produced by the first functional operator and the second functional operator.

9. A computer program product comprising instructions embodied on a non-transitory computer readable medium and being arranged to, when loaded and executed on a computer processor, execute the method according to the following steps:

applying a first functional operator, via the computer processor, arranged to cause an alteration to said processed signal, said first operator being embedded in said processing module; and arranging a second functional operator configured to co-operate with said first operator such that said alteration is cancelled, wherein at least a part of said second operator is adapted to act as an extractable identifier serving as a watermark for said processing module.

10. Digital signal processing equipment, comprising a processing module according to claim 5.

11. The method of claim 1, wherein the first and second functional operators transfer therebetween functional information as opposed to a detectable data stream indicative of a code.

12. The method of claim 1, wherein the second functional operator is visible once extracted.

13. The processing module of claim 5, wherein the first and second functional operators are configured and arranged to transfer therebetween functional information as opposed to a detectable data stream indicative of a code.

14. The processing module of claim 5, wherein the second functional operator is configured and arranged to be visible once extracted.

15. The computer program product of claim 9, wherein the first and second functional operators are configured and arranged to transfer therebetween functional information as opposed to a detectable data stream indicative of a code.

16. The computer program product of claim 9, wherein the second functional operator is configured and arranged to be visible once extracted.

17. The computer program product of claim 9, wherein the steps of applying a first functional operator and arranging a second functional operator are sequentially executed.

18. The computer program product of claim 9, wherein the step of arranging a second functional operator includes embedding the second functional operator with an additional processing module and further including a step of combining outputs from the processing module and the additional processing module to produce the processed signal free of alterations.

* * * * *